March 24, 1964

S. TUDJA 3,126,275

PROCESS FOR EXTRACTION OF METAL POWDERS, MAINLY IRON POWDER, FROM ORES

Filed May 24, 1960

INVENTOR.
STEFAN TUDJA

BY *Emory L. Groff*
*Emory L. Groff Jr.*
ATTORNEYS

United States Patent Office
3,126,275
Patented Mar. 24, 1964

3,126,275
PROCESS FOR EXTRACTION OF METAL POWDERS, MAINLY IRON POWDER, FROM ORES
Stefan Tudja, Rua Sao Klemente 107, Rio de Janeiro, Brazil
Filed May 24, 1960, Ser. No. 31,425
Claims priority, application Yugoslavia June 4, 1959
8 Claims. (Cl. 75—26)

This invention relates to methods for extracting metals in the form of metal powders from their respective ores.

Heretofore known processes or methods for extracting metals from their respective ores were carried out in shaft furnaces or in rotary kilns by (1) reducing the ore with carbon containing materials at a high temperature thereby forming smelted metal and gangue, the gangue, having a specific gravity less than that of the metal, floating on top of the smelted metal, and (2) by reducing the ore with gaseous carbon monoxide, CO, produced by and recovered from furnace gases formed in other smelting processes. In processes or methods such as (1), sufficient fuel must be used to permit the smelting of the so-reduced metal and the gangue for the reason that said so-reduced metal and the gangue are more easily smelted when such additional fuel is added. In the processes or methods such as (2), the temperatures at which the ore is reduced are so high that the sintering of the so-reduced metal must be and is prevented by the use of special addition agents such as soot or powdered coal.

In accordance with this invention, any type of metal ore can be reduced to its metal by heating the fine-mesh and dry ore in the presence of CO-containing gas in a reaction nozzle to a reducing temperature below the melting point of the metal and its gangue and by simultaneously cooling the metal and its gangue and separating the metal from its gangue, by reason of the respective different specific gravities, and of course specific weights, of said so-reduced metal and its gangue in a chamber directly adjacent to the nozzle.

To avoid a new formation of metal oxides finest powdered coal is added to the powdery reaction product. For the development of CO we can use all kinds of powdery coal residues and low-quality coal, such as brown-coal.

Furthermore the low reduced temperature prevents impurities—such as sulphur, phosphorus, etc. originating from gangue and coal—from passing to the metal.

The excessive heat resulting from the generation of CO is mainly used for drying the ores.

An object of this invention is to provide methods or processes for extracting metal powders from their respective ores wherein the metal ore is reduced within a nozzle thereby forming the metal and its gangue and the so-formed metal and its gangue is immediately caused to pass into a separation chamber wherein the simultaneous cooling of the metal and gangue and separation of the metal from its gangue is caused to take place.

Other objects and features will become apparent from the following detailed description, which is merely illustrative and does not limit this invention.

Figure 1:
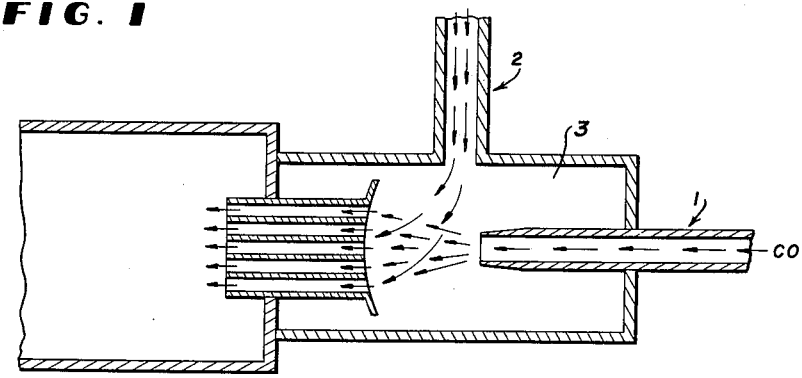
FIGURE 1 is a sectional view through one embodiment of an apparatus in which the process of this invention is carried out.

More specifically, by way of example, in a process for extracting iron powder from its ore, referring to FIGURE 1, a mixture of ore, or ore powder, and coal heated to a temperature of 500° C. to 600° C. is passed through pipe 2 into the reaction nozzle 3, and CO gas under a pressure of 2 to 3 atmospheres is likewise passed through pipe 1 into said nozzle 3, thereby carrying along with it the ore and coal mixture, much in the manner of a sand blast apparatus, the outlet velocity of the reduced metal and its gangue, at the reaction nozzle outlet, depending on the pressure under which the hot CO gas is passed into the nozzle 3.

The nozzle openings—also in the case of manifold or honey-comb nozzles—and the gas quantity may be adjusted to a great extent. The use of pressure gas is advisable only for very small performances, for placing hot gases of a considerable amount under pressure causes noticeable technical difficulties.

Figure 2:
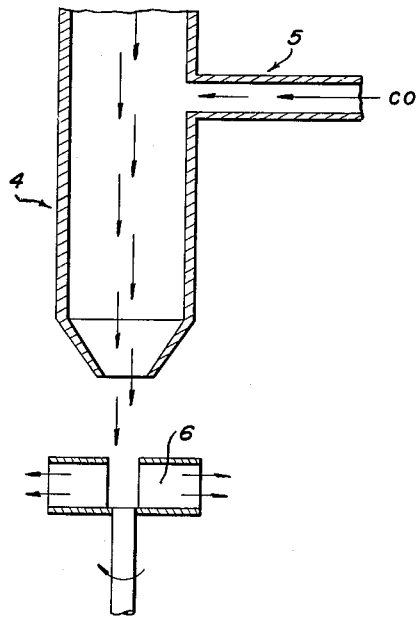
FIGURE 2 is a sectional view through another embodiment of an apparatus in which the process of this invention is carried out.

For large-scale plants use is made of the centrifugal force. In this way the installation is not stressed so much by the hot gases and requires very little power. While in the first instance the pressure gas causes transportation, mixture and ejection, the contrary occurs in the case of use of the centrifugal force. In this latter instance (as shown in FIGURE 2), the mixture of ore and coal caused to pass through reaction nozzle 4 by the mixing disc sucks the CO gas through pipe 5 and mixes with it. Since the hot particles of iron and powdered coal fall onto the mixing disc 6 provided with grooves (like a centrifugal pump) and the hot reaction gas also comes in, the mixing disc is made of highly fire-proof ceramic mass (e.g. magnesia mass). Because of the forces which show up the disc is framed in steel. The outlet speed is determined by the number of revolutions and the disc diameter.

When the ore and gas come together the reduction is achieved by stages. According to the known tables of Walter Mathesius (Chemical Technology of Metallurgy of Iron, pages 87/88), this reaction is weak from an exothermic standpoint and only the thirtieth part is employed on this instance of the heat which would be required if carbon were employed as a reaction agent.

When the ore and gas mix the initial temperature is about 600° C. and the temperature rises to 900–1000° C. due to the exothermic reaction. This latter temperature is noticed at a certain distance from the nozzle outlet. At this stage the ore powder has already been reduced to metal. The gangue, for instance the silicic acid, does not react at such temperatures and neither is it capable of reacting in connection with other additional substances, i.e. no silicates are formed in spite of the presence of the iron which can combine with the silicic acid and bring about a fall of the melting point only in its oxide compound (prevention of the sintering of the gangue). The so reduced iron tends to return to its original state, which occurs very quickly at higher temperatures. It would be advisable to form first the unstable iron oxide and only then the other oxygen compounds, thereby preventing quick cooling, and addition of powdered coal favors the reaction $CO_2+C \rightarrow 2CO$, thereby producing CO gas.

Figure 3:
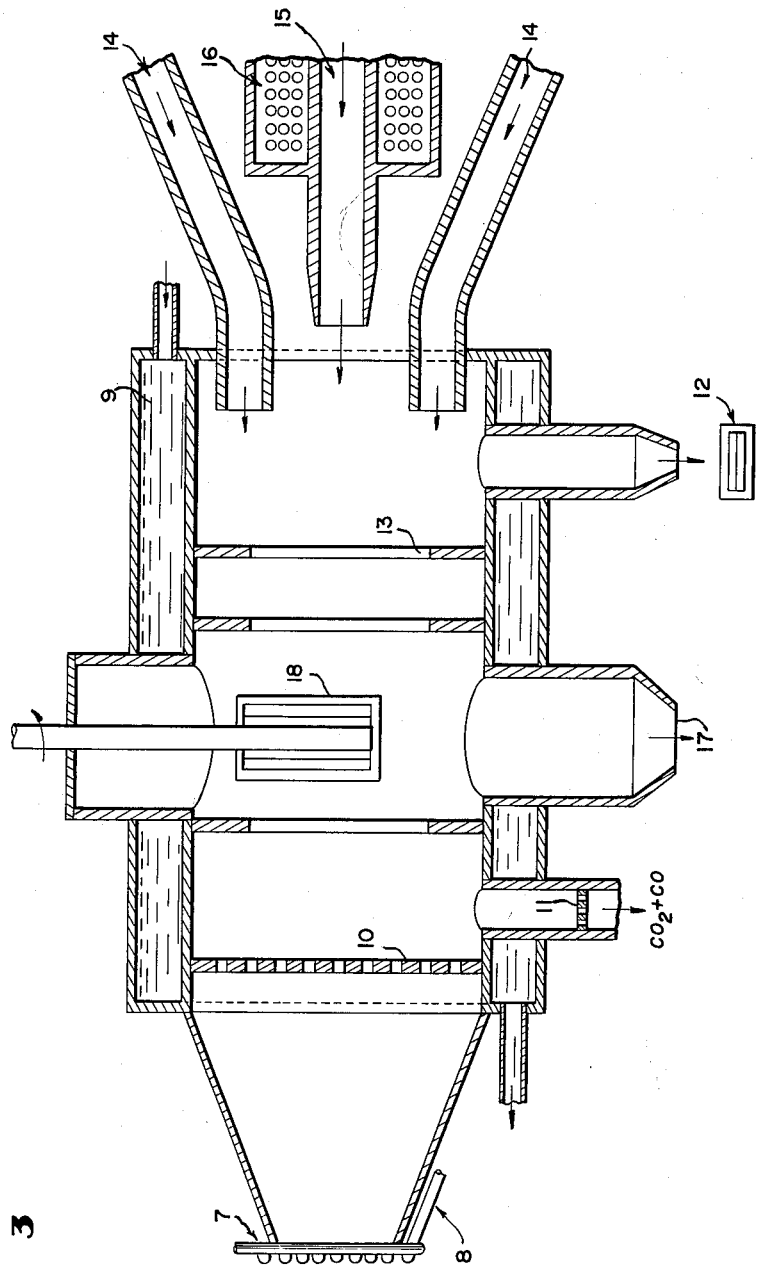
FIGURE 3 is a sectional view through still another embodiment of an apparatus in which the process of this invention is carried out.

Metallic iron has a specific gravity of approximately 7.6, and the gangue about 1.8–2.4. As the mixture of metallic iron and gangue leaves the nozzle with a given speed and is thrown into the cold-zone chamber or separator, referring to FIGURE 3, the iron, being heavier than the gangue, is propelled further than is the relatively light gangue. In FIGURE 3, the structure includes the flame ring 7, the gas pipe 8, the separation chamber cooling water jacket 9 through which cooling water circulates, thereby to cool said separation chamber, ceramic sieves 10, 11 magnet 12, retaining walls 13, cooling gas pipes 14, reaction nozzle 15 in which the mixture of ore and coal is reduced to the metallic iron and its gangue, reaction nozzle heating means 16 for heating the reaction mixture to approximately 800° C., iron outlet 17, and magnet 18. What determines the trajectory is the initial speed, transverse load and gravity acceleration (9.81 m./s.²), therefore allowing the so-formed iron to separate from its gangue especially in view of the fact that the gangue has a much shorter trajectory.

This separation is completed especially by reason of the presence of an adjustable electromagnet in the cool zone. In order to prevent any iron loss the gangue can also be discharged through an electromagnet.

The extracted metal powder can then be immediately worked into profiled products by means of presses and sintering.

The extraction of iron according to the new metallurgical process is preferably carried out as hereinafter described.

The essential point in this process, beside other points, is that the radiation of the heat be reduced to a minimum for the masses which take on the heat are extraordinarily small.

Here there can be no question of a water cooling as in the case of blast furnaces and electrical furnaces.

For the reduction of the oxidized ores only CO is used, which is already at a temperature of 200° C. combines to $CO_2$ with the O of the ores. It is known (Walter Mathesius, page 87) that the reduction from iron oxides by carbon represents a reaction consuming a considerable amount of heat, while when CO is used as a reducing agent, the consumption of heat in the reduction of ferrous oxide FeO is 6.5 times smaller than in the case where carbon is used as a reducing agent. When we submit magnetite (ferrosoferric oxide), $Fe_3O_4$, to the reducing process, the consumption of heat when CO is used is only approximately $\frac{1}{30}$ of what would be required if carbon were to be employed as a reducing agent, the reduction becoming exothermic, though only to a slight degree, when CO is used. But if the CO has such an action on iron oxides that it results in a gradual decomposition, the result will be a highly exothermic reaction.

Since in the new metallurgical process the oxide ores are intimately mixed with the CO at proper temperatures which are far below the melting point of the iron, the heat as well as carbon consumption is extremely reduced. An important factor in coal-poor countries is that also electrical current can be used for production of heat, so that coal consumption must be taken into consideration exclusively for the reducing process. As the resulting $CO_2$ is again employed in the circulation for production of CO, the figures of coal consumption fall quite considerably; with this process even very poor ores can be utilized. The excess of $CO_2$ can very easily be converted into solid $CO_2$ (Dry Ice).

The iron extracted by the new process is very pure and carbon-free. It is only at higher temperatures that the metal iron and carbon combine together to iron carbide, $Fe_3C$, which is soluble in liquid iron.

In the new process the iron comes out in the form of a powder. This iron powder is quickly and easily converted into raw lumps without any melting process and also in this case heat consumption is very small.

These raw lumps serve for the production of wrought iron and high-quality steel. By means of coal addition in the electrical furnace we can also manufacture high-quality cast iron.

The new iron thus extracted is by far more corrosion-proof than the now existing, which can easily be observed if we study the nature of the corrosion. According to recent researches the main reason for the process of corrosion are gases which are being absorbed, specially light ones as hydrogen gas absorbed by the iron. The process of corrosion can be divided into two stages:

(1) All metals tend to return to their original state (noble metals, such as gold and platinum are found pure in nature). The tendency is stronger the more energy has been used for the extraction.

(2) Corrosion is of an electro-chemical nature. Due to gases, etc., local elements are formed in the metal which bring about the destruction of the metal.

If we consider that elementary phenomena such as earthquakes, fires, etc., do cause less prejudice than rust, it is of course worthwhile to endeavor to manufacture a highly corrosion-proof iron without adjuvants such as nickel and chromium. It is known, for instance, that electrolytic iron, the manufacturing process of which is rather expensive, is subject to corrosion by far less than usual first-quality wrought iron. Although this electrolytic iron will corrode in a water solution, a water solution is made use of in the manufacture of electrolytic iron, and hydrogen is also formed and absorbed by the iron. Not even the subsequent heating is capable of removing the absorbed hydrogen completely.

The equipment for the new process is of a very simple construction and attendance. The cost of the equipment is extraordinarily low and can by no means be compared with the high charges involved in a blast furnace or a similar plant. The performance of the equipment can exceed that of the largest blast furnaces in individual instances; the space required takes, however, a maximum of $\frac{1}{10}$ of the usually required space, so that a considerable saving is already made in the construction of the metallurgical plant.

The cost is reduced still more by the fact that also coal of lowest quality, and even fine coal can be used. Thus coal most advantageous from the freight and price point of view can be employed.

I claim:

1. The process for extracting a metal powder from its ore comprising simultaneously passing preheated ore and preheated CO-containing gas into a heated reaction nozzle, said heated nozzle being at a temperature above the temperature of said preheated ore and the temperature of said preheated CO-containing gas and below the melting point temperature of the metal and its gangue, thereby obtaining the metal powder and its gangue, said nozzle being maintained at a temperature at which the metal in the ore is reduced to its metallic state, and passing the so-formed metal powder and its gangue into a cooled separating chamber, and simultaneously separating said metal powder from its gangue by projecting said gangue at a shorter distance from the heated nozzle than the distance of said metal powder from said heated nozzle and cooling said powder and gangue.

2. The process of claim 1 wherein the metal powder is iron powder and the ore is iron ore.

3. The process of claim 1 wherein the ore is in a finely subdivided dry state.

4. The process for extracting a metal powder from its ore comprising simultaneously passing preheated ore and preheated CO-containing gas into a reaction nozzle, said heated nozzle being at a temperature above the temperature of said preheated ore and the temperature of said preheated CO-containing gas and below the melting point temperature of the metal and its gangue, said gas being under pressure, thereby forming the metal powder and its gangue, said nozzle being maintained at a temperature at which the metal in the ore is reduced to its metallic state, and passing the so-formed metal powder and its gangue into a cooled separating chamber, and simultaneously separating said metal powder from its gangue by projecting said gangue at a shorter distance from the heated nozzle than the distance of said metal powder from said heated nozzle and cooling said powder and gangue while passing from said reaction nozzle into said chamber and also in said chamber.

5. The process of claim 4 wherein the metal powder is iron powder.

6. The process of claim 4 wherein the ore is in a finely subdivided dry state.

7. The process of claim 4 wherein said ore is a magnetic metal-containing ore and the so-formed magnetic metal powder and its gangue are passed through a magnetic field in said cooled separating chamber.

8. The process for extracting a magnetic metal powder from its ore comprising simultaneously passing preheated ore and preheated CO-containing gas into a heated reaction nozzle, said heated nozzle being at a temperature above the temperature of said preheated ore and the temperature of said preheated CO-containing gas and below the melting point temperature of the magnetic metal and its gangue, thereby obtaining the magnetic metal powder and its gangue, said nozzle being maintained at a temperature at which the metal in the ore is reduced to its metallic state, and passing the so-formed magnetic metal powder and its gangue through a magnetic field in a cooled separating chamber, and simultaneously separating said magnetic metal powder from its gangue by projecting said gangue at a shorter distance from the heated nozzle than the distance of said metal powder from said heated nozzle and cooling said powder and gangue.

References Cited in the file of this patent

UNITED STATES PATENTS

| | | |
|---|---|---|
| 1,524,182 | Kjolberg | Jan. 27, 1925 |
| 2,048,111 | Gahl | July 21, 1936 |
| 2,296,522 | Hartley | Sept. 22, 1942 |

FOREIGN PATENTS

| | | |
|---|---|---|
| 1,062,621 | France | Dec. 9, 1953 |